United States Patent
Kawanishi et al.

(10) Patent No.: US 7,212,331 B2
(45) Date of Patent: May 1, 2007

(54) RECIPROCATING OPTICAL MODULATOR

(75) Inventors: Tetsuya Kawanishi, Koganei (JP); Masayuki Izutsu, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 5 days.

(21) Appl. No.: 11/094,761

(22) Filed: Mar. 31, 2005

(65) Prior Publication Data

US 2006/0227411 A1    Oct. 12, 2006

(51) Int. Cl.
G02F 1/00 (2006.01)
G02B 26/00 (2006.01)

(52) U.S. Cl. .................... 359/321; 359/238

(58) Field of Classification Search ........... 359/246, 359/238, 181, 309, 249, 239, 237, 245, 247, 359/251, 254, 261, 267, 276, 278, 279, 284, 359/300, 302, 308, 317, 318, 231
See application file for complete search history.

(56) References Cited

U.S. PATENT DOCUMENTS 6,600,588 B2 * 7/2003 Kawanishi ........... 359/246
6,707,586 B2 * 3/2004 Kawanishi ........... 359/238

FOREIGN PATENT DOCUMENTS

| JP | 5-55680 | 3/1993 |
| JP | 2000-6275 | 1/2000 |
| JP | 2002-148572 | 5/2002 |
| JP | 2004-347709 | 12/2004 |

OTHER PUBLICATIONS

Ch. Becker, et al., "Integrated Optical Ti:Er:LINbO$_3$ distributed Bragg reflector laser with a fixed photorefractive gratin", Optics Letters, vol. 23, No. 15, Aug. 1, 1998, pp. 1194-1196.
B. K. Das, et al., "Single-frequency Ti:Er:LINbO$_3$ distributed Bragg reflector waveguide laser with thermally fixed photorefractive cavity", Applied Physics B-Laser and Optics, B73, 2001, pp. 439-442.
I. Baumann, et al., "Er-Doped Integrated Optical Devices in LiNbO$_3$", IEEE Journal of Selected Topics in Quantum Electronics, vol. 2, No. 2, Jun. 1996, pp. 355-366.

* cited by examiner

*Primary Examiner*—Ricky Mack
*Assistant Examiner*—Tuyen Tra
(74) *Attorney, Agent, or Firm*—Oblon, Spivak, McClelland, Maier & Neustadt, P.C.

(57) ABSTRACT

A reciprocating optical modulator includes a continuous light path fulfilling an amplification function, an optical modulation part formed on the light path, a first optical band-pass filter and a second optical band-pass filter formed to nip the optical modulation part therebetween and a device to introduce exciting light for exciting the light path. The optical modulation part, first and second optical band-pass filters and device are disposed on the light path as formed in a single optical crystal or in a multiplicity of optical crystals. The first optical band-pass filter admits incident light and reflects light having the incident light modulated. The second optical bandpass filter reflects the incident light and emits the light having the incident light modulated. The modulator can also include a third optical band-pass filter disposed between the optical modulation part and the second optical band-pass filter for removing the incident light.

2 Claims, 7 Drawing Sheets

RECIPROCATING OPTICAL MODULATOR

BACKGROUND OF THE INVENTION

1. Field of the Invention

This invention relates to a reciprocating optical modulator which is capable of effecting optical modulation with a high-frequency radio signal in a simple structure and permitting downsizing as well.

2. Description of the Prior Art

JP-A 2000-6275 discloses an optical modulator which, by means of a device provided with a structure for introducing a laser beam into a kind of light reflecting resonator and causing the light being reciprocated through the interior thereof to be modulated up to a plurality of reflections, thereby obtaining a higher-order sideband and with a band-pass filter for passing out of the higher-order sideband the part thereof exceeding the expected order of sideband, is enabled to obtain a light modulated in intensity with a frequency which is integer times the frequency of the input high-frequency electric signal. It further discloses a structure which has an optical amplifier disposed in the reflecting resonator.

A laser device having a light path, a reflecting layer and a reflecting grating range provided in an erbium (Er)-doped lithium niobate ($LiNbO_3$) crystal as illustrated in FIG. 6 herein is disclosed in "Integrated optical Ti:Er:$LiNbO_3$ distributed Bragg reflector laser with a fixed photorefractive grating," Ch. Becker, et al., OPTICS LETTERS, Vol. 23, No. 15, 1194–1196, Aug. 1, 1998.

A laser device which is furnished with an optical resonator formed of a region interposed between two reflecting grating regions adopted in the place of the reflecting layer mentioned above as illustrated in FIG. 7 herein is disclosed in "Single-frequency Ti:Er $LiNbO_3$ distributed Bragg reflector waveguide laser with thermally fixed photorefractive cavity," B. K. Das, et al., Appl. Phys., B73, 439–442 (2001).

Further, an optical modulator which has a Mach-Zehnder optical interferometer formed on a lithium niobate ($LiNbO_3$) crystal has been well known already in the art.

The optical modulator disclosed in JP-A 2000-6275 is capable of obtaining a modulated light including a high-order sideband. The strength of the output produced by this modulator, however, tends to decrease suddenly in accordance as the order is heightened. With a view to exalting the output strength, therefore, a structure using an optical amplifier is disclosed. Generally, for the purpose of enhancing the response speed, it is necessary to shorten the length of the light path for reciprocation of the light. Since the structure which permits downsizing is not disclosed, it is still impossible to effect modulation with a modulating signal of a broad bandwidth. Though the laser device which is disclosed in the prior art of Ch. Becker, et al. or B. K. Das, et al. is usable as an oscillator or an amplifier, it cannot be used as an optical modulator. Further, the Mach-Zehnder optical modulator formed on the lithium niobate ($LiNbO_3$) crystal incurs difficulty in obtaining a higher-order sideband with a high-frequency electric signal of small amplitude.

This invention has been initiated in view of the state of affairs described above and is aimed at providing a reciprocating optical modulator which, in spite of effecting modulation with a modulating signal having a broad bandwidth, is capable of easily modulating light with a high-frequency radio signal in a simple structure and permitting downsizing as well.

SUMMARY OF THE INVENTION

With a view to accomplishing the object mentioned above, the present invention provides a reciprocating optical modulator comprising a continuous light path fulfilling an amplification function and, an optical modulation part formed on the light path a first optical band-pass filter and a second optical band-pass filter formed to nip the optical modulation part therebetween and means to introduce exciting light for exciting the light path, the optical modulation part, first and second optical band-pass filters and means being disposed on the light path as formed in a single optical crystal or in a multiplicity of optical crystals, the first optical band-pass filter admitting incident light and reflecting light having the incident light modulated, the second optical band-pass filter reflecting the incident light and emitting the light having the incident light modulated.

The reciprocating optical modulator further comprises a third optical band-pass filter disposed between the optical modulation part and the second optical band-pass filter for removing the incident light.

In the reciprocating optical modulator, the optical crystal or optical crystals comprise lithium niobate ($LiNbO_3$), the optical modulation part uses an optical modulator which utilizes an electro-optical effect incited in conformity with voltage applied to an electrode disposed on the light path and formed by diffusion of an impurity, the light path is formed by doping the optical crystal or optical crystals with erbium (Er), and the first and second optical band-pass filters or the first, second and third optical band-pass filters individually use an optical band-pass filter utilizing a periodic pattern formed on the optical crystal or optical crystals.

Owing to the adoption of such a structure as described above, the first optical band-pass filter of the reciprocating optical modulator of this invention is capable of admitting incident light and reflecting light having the incident light modulated and the second optical band-pass filter thereof is capable of reflecting the incident light, outputting the light having the incident light modulated and outputting an optical sideband of which frequency is a natural number times of the modulating signal frequency. Consequently, the reciprocating optical modulator of this invention is enabled to acquire a simple and small structure, supply a modulating signal by the use of an amplifier or a feeder line having a comparatively narrow bandwidth and facilitate the handling of a modulating signal.

DESCRIPTION OF THE PREFERRED EMBODIMENT

Figure 1:
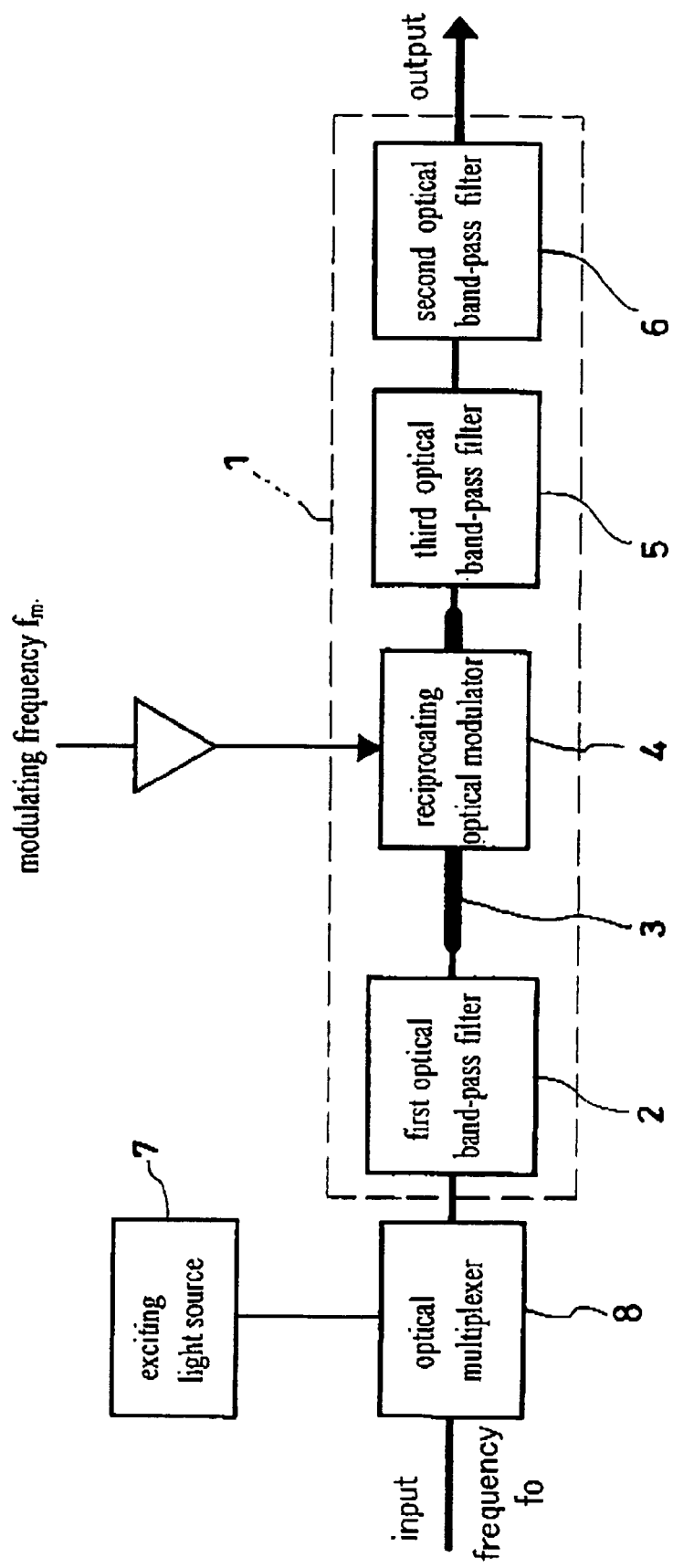
FIG. 1 is a block diagram illustrating the basic configuration of a reciprocating optical modulator according to this invention.

Now, the embodiments of this invention will be described in detail below with reference to the accompanying drawings. Same reference numerals are used in the drawings to denote like components or components fulfilling like functions unless for a particular reason.

The embodiment of an optical modulator 1 according to this invention is illustrated in the block diagram of FIG. 1. The input light in FIG. 1 is light having a first frequency f$_0$. The configuration of FIG. 1, with the object of exciting a light path fulfilling the function of amplification as described specifically hereinafter, causes the input light to be combined with exciting light from an exciting light source 7 in a optical multiplexer 8 and injects the resultant combined wave into a first optical band-pass filter 2. The first optical band-pass filter 2 is formed of a narrow-band filter. This filter possesses a characteristic property of passing the input light of the frequency f$_0$ and reflecting the light deviating more than a small predetermined frequency. A light path 3 fulfilling the function of amplification is formed in a region 12 doped with erbium (Er) (FIG. 4) and adapted to be excited with the exciting light source 7. A reciprocating optical modulator 4 is a optical intensity modulator which is capable of modulating the light directed from the first optical band-pass filter 2 toward a second optical band-pass filter 6 or the light directed inversely with an identical characteristic of a modulating frequency f$_m$. The second optical band-pass filter 6 is a band rejection filter and this filter possesses a characteristic property of reflecting sidebands up to the n'th order (n denotes an integer≧3, such as, for example n=3) and passing the other light. A third optical band-pass filter 5 is intended to prevent the input light of the frequency f$_0$ for the purpose of preventing the exciting energy stored in the excitation medium in the light path 3 fulfilling the function of amplification from being wastefully consumed. Though the reciprocating optical modulator contemplated by this invention succeeds in operating even in the absence of this third optical band-pass filter 5, the presence of this filter is commendable for the sake of preventing wasteful amplification. Since the light path 3 fulfilling the function of amplification is intended to compensate the attenuation of the light intensity occurring in the first, second or third optical band-pass filter or in the optical modulation part, the relevant component can be operated even in the absence of the light path 3 fulfilling the function of amplification.

Figure 2:
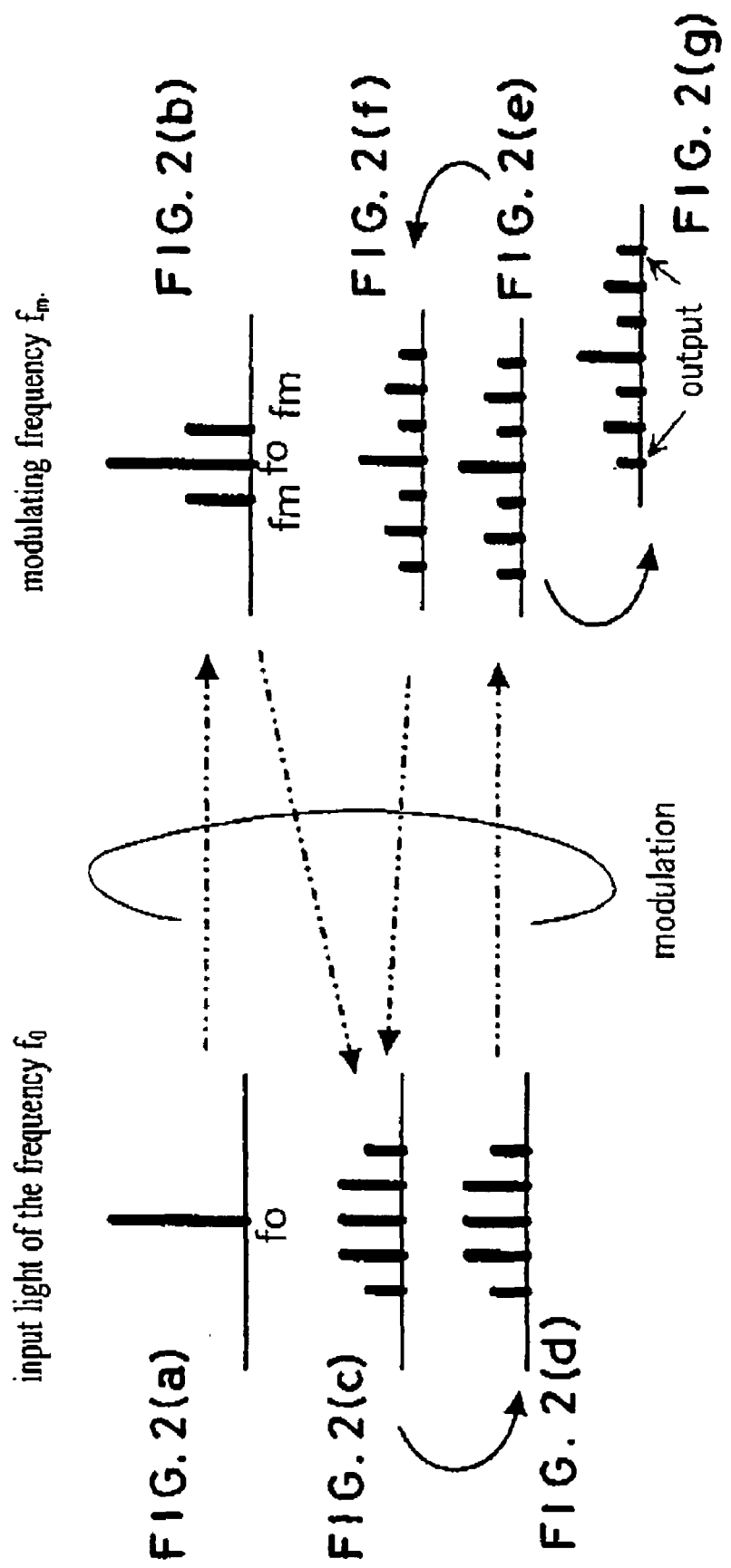
FIG. 2 is a diagram illustrating the operation of modulation of reciprocating variably multiplied light.

When the configuration is as described above, the incident light of the frequency f$_0$ which has been input via the first optical band-pass filter as shown in FIG. 2 is amplified and modulated in the light path fulfilling the function of amplification and consequently made to generate a double sideband shown in FIG. 2(b). For the sake of simplicity of the explanation, it is assumed that the modulation is effected linearly and, therefore, it is made to produce a carrier wave and a primary double sideband exclusively. This light is input into the third optical band-pass filter and caused to suppress the incident light. Since the input light having the frequency f$_0$ is removed by the third optical band-pass filter, the light which has been returned again to the first optical band-pass filter and further reflected is restricted to the sideband. Thus, the input light is not amplified and the otherwise possible consumption of energy by amplification can be avoided.

The light which has been modulated once and reflected by the second optical band-pass filter is again passed through the optical intensity modulator. In this case, the double sideband is modulated again to produce a spectrum shown in FIG. 2(c). In these lights, since the carrier wave is suppressed by the third optical band-pass filter, the sideband remains substantially solely as shown in FIG. 2(d). Since this light is amplified in the light path 3, it is enabled to restore the loss by the third optical band-pass filter, again reflected, further modulated and allowed to assume a spectrum shown in FIG. 2(e). This modulation results in generating a first-order and a third-order sideband, the third-order sideband shown in FIG. 2(g) is allowed in advance to acquire a band limiting property of its own so as to pass the band rejection filter of the second optical band-pass filter. Owing to this setting, the primary-order sidebands, for example, shown in FIG. 2(f) are reflected. But, the band limiting filter passes a third-order double sideband.

Though the preceding explanation has depicted the optical modulator as an intensity modulator, it is easily understood that the same effect is attained with a phase modulator or a single-sideband modulator. The modulators which are applicable to the present invention embrace resonator type modulators and traveling wave type modulators. Not merely in the resonator type modulators as a matter of course but also in the traveling wave type modulators, the modulation can be attained on the light of either of the directions with the same property by providing them at the opposite terminals thereof with respective electrodes and inputting modulating signals through the terminals.

Figure 3:
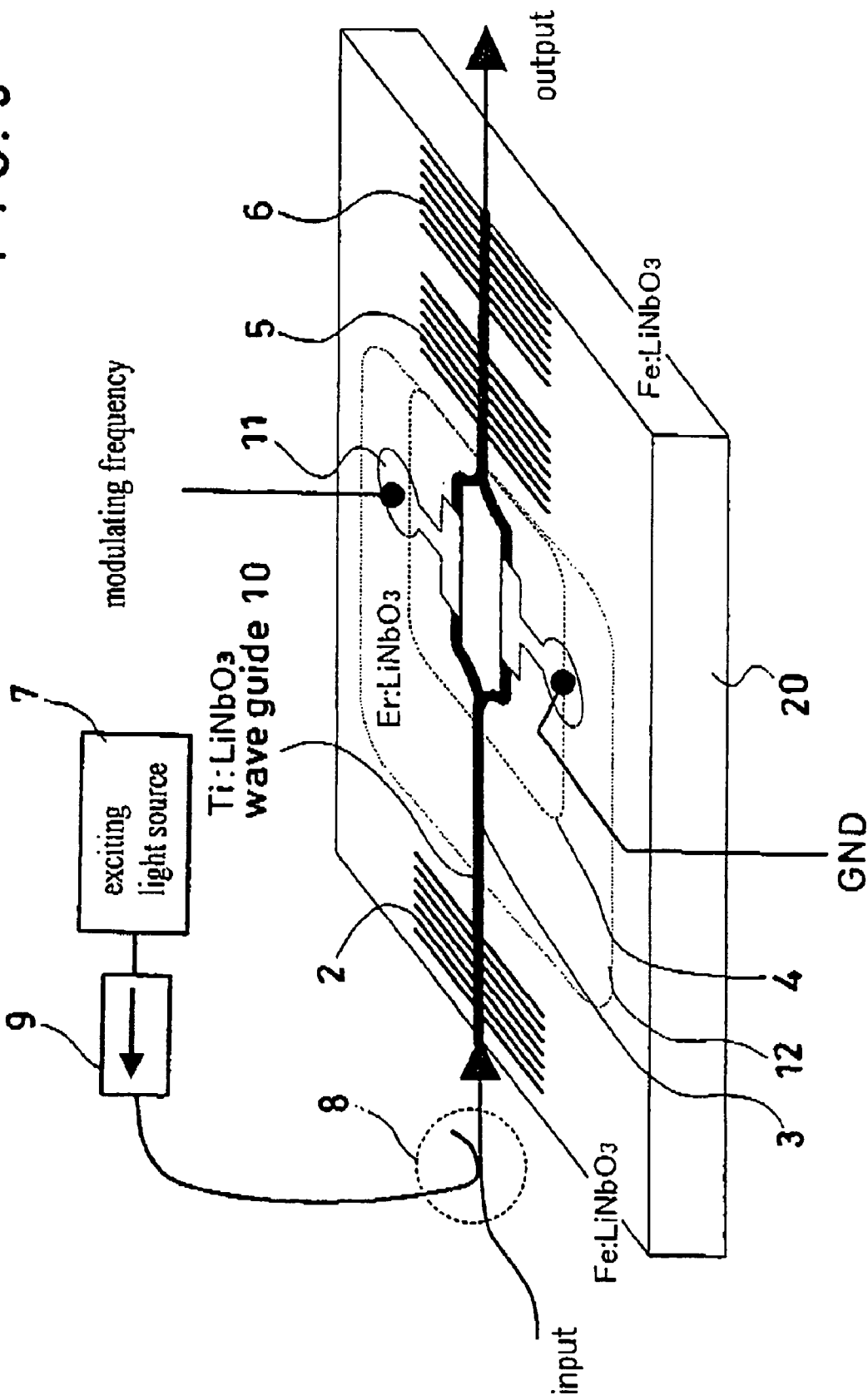
FIG. 3 is a perspective view illustrating one embodiment of the reciprocating optical modulator of this invention having the components thereof formed on a single crystal.

The light path 3 fulfilling the function of amplification, the optical modulation part 4, first optical band-pass filter 2, second optical band-pass filter 6 and third optical band-pass filter 5 shown in FIG. 1 are formed on one LiNbO$_3$ crystal as illustrated in FIG. 3, for example. The individual components are formed by respective methods which have been well known in the art. For example, an X cut LiNbO$_3$ crystal 20 is prepared for a start and then worked to make the longer direction thereof the C axis of crystal. Next, the doping of Erbium (Er) is effected for the formation of the light path fulfilling the function of amplification. The parts of the crystal destined to form the first, second and third optical band-pass filters are doped with iron (Fe). Subsequently, the waveguide destined to serve as a light path is formed by diffusing titanium (Ti). The optical modulator illustrated in FIG. 3 is of a Mach-Zehnder type. Next, a diffraction grating is formed by preparing the LiNbO$_3$ crystal in a heated state and subjecting this crystal to holography using an argon ion laser. Further, the LiNbO$_3$ crystal is provided on the surface thereof with a silicon oxide coating and electrodes of gold are formed thereon to finish the optical modulator.

Figure 4:
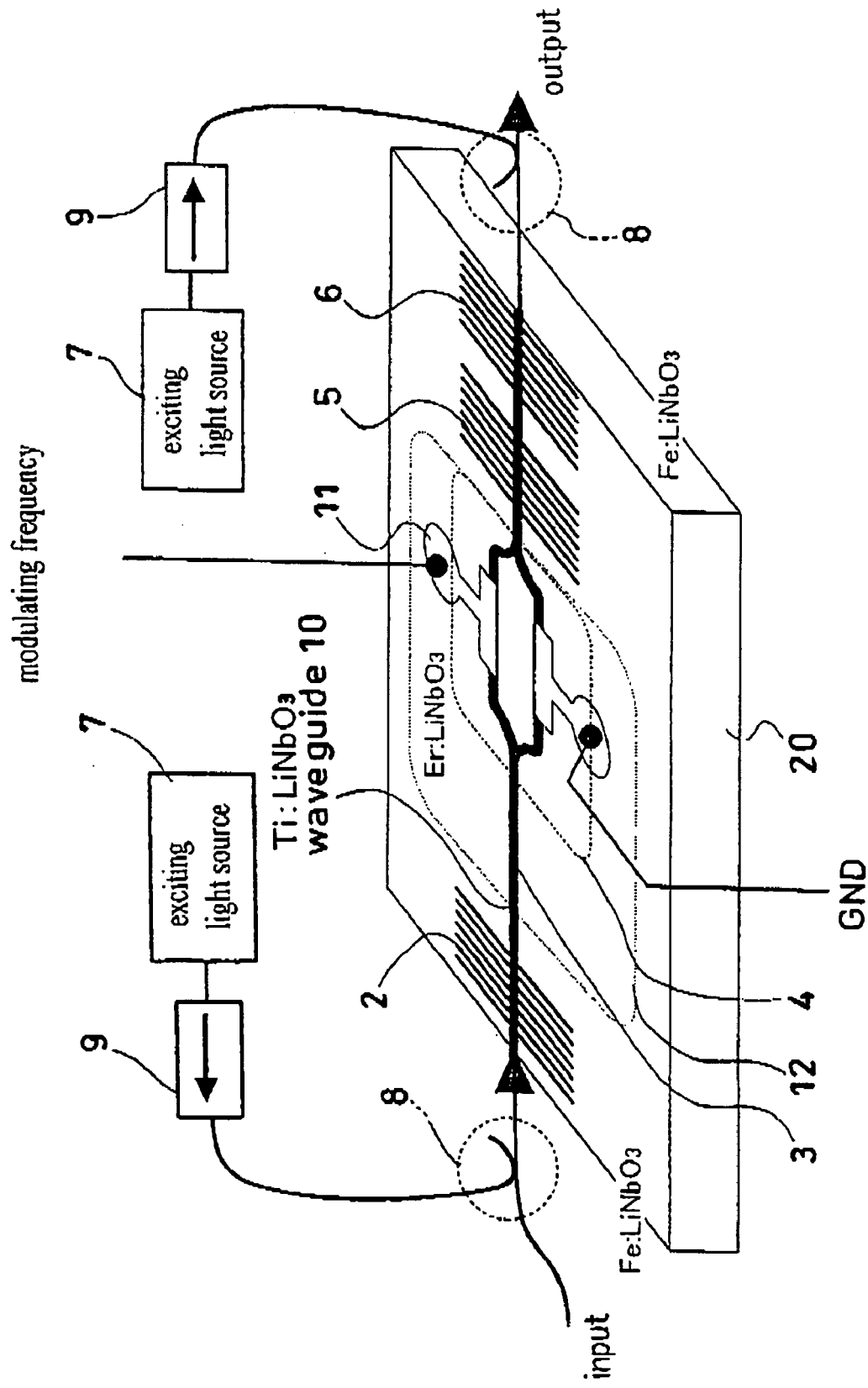
FIG. 4 is a perspective view illustrating another embodiment of the reciprocating optical modulator of this invention using two exciting light sources.

In the configuration of FIG. 1, the exciting light is injected from the side of the first optical band-pass filter 2. The injection from the side of the second optical band-pass filer 6 as illustrated in FIG. 4 is also effective. The excitation is attained more effectively by injecting the exciting light from these two sides.

Figure 5:
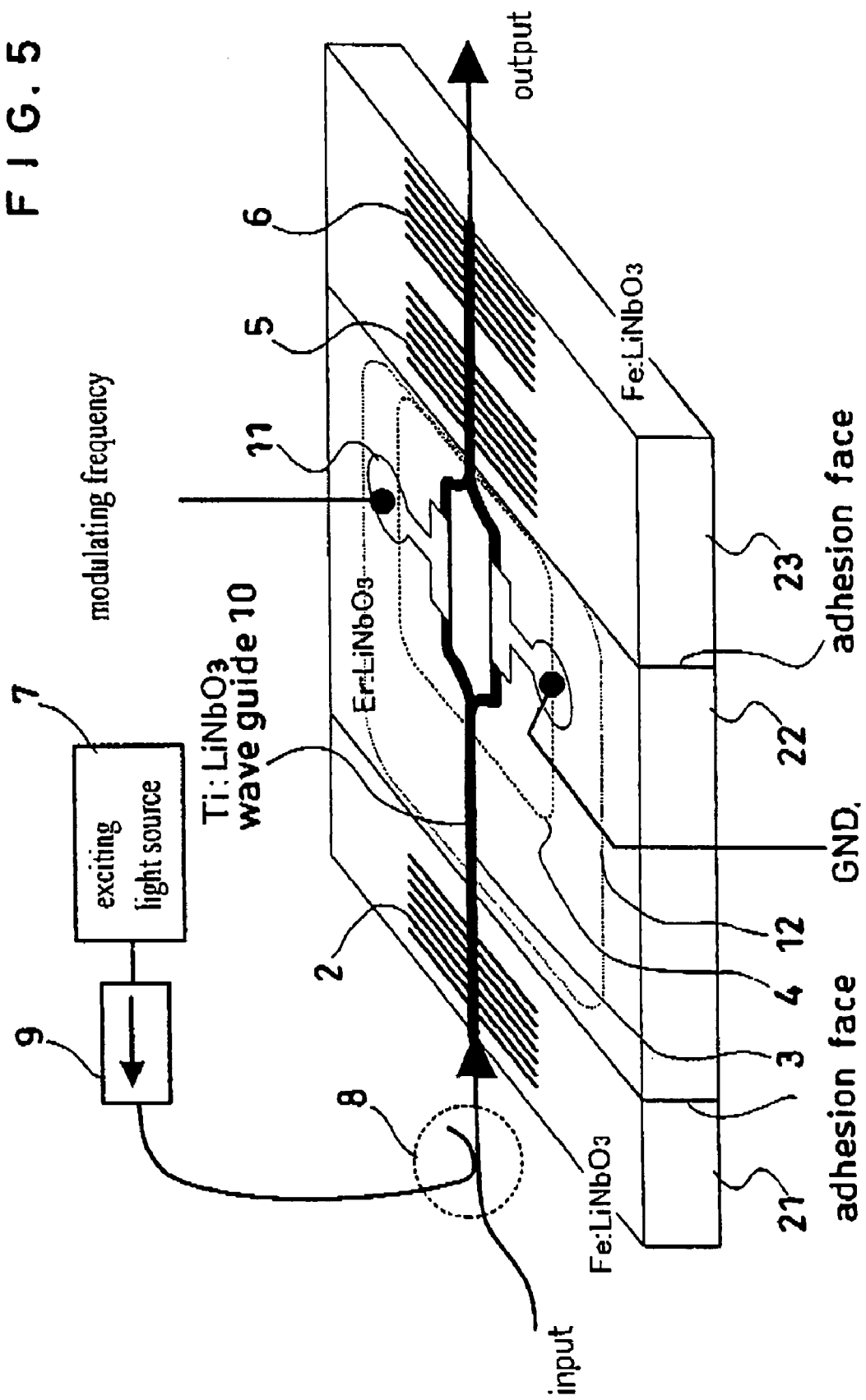
FIG. 5 is a perspective view illustrating still another embodiment of the reciprocating optical modulator of this invention having the components thereof formed on a plurality of crystals.
Figure 6:
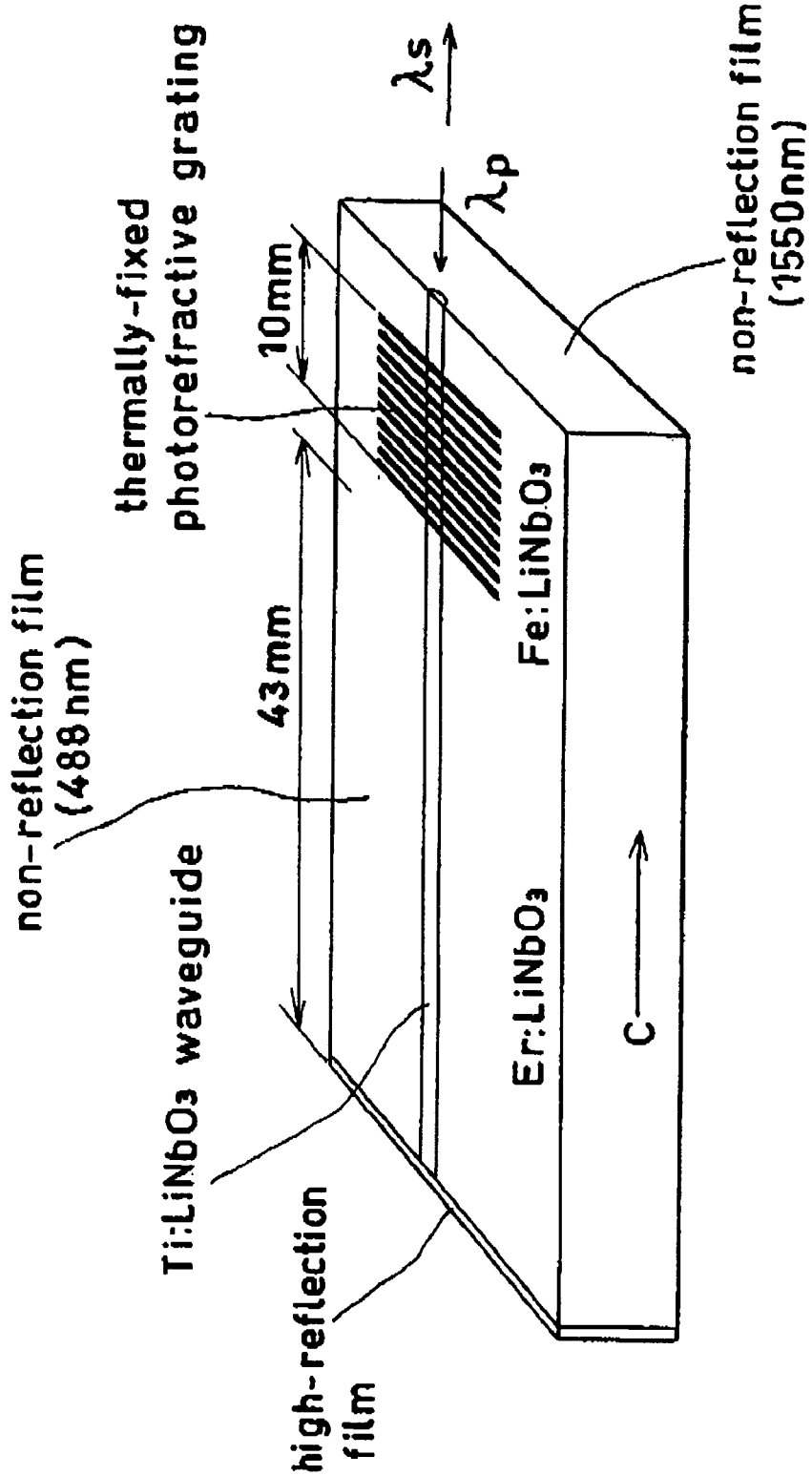
FIG. 6 is a perspective view illustrating a laser using a $LiNbO_3$ crystal as a first conventional example.
Figure 7:
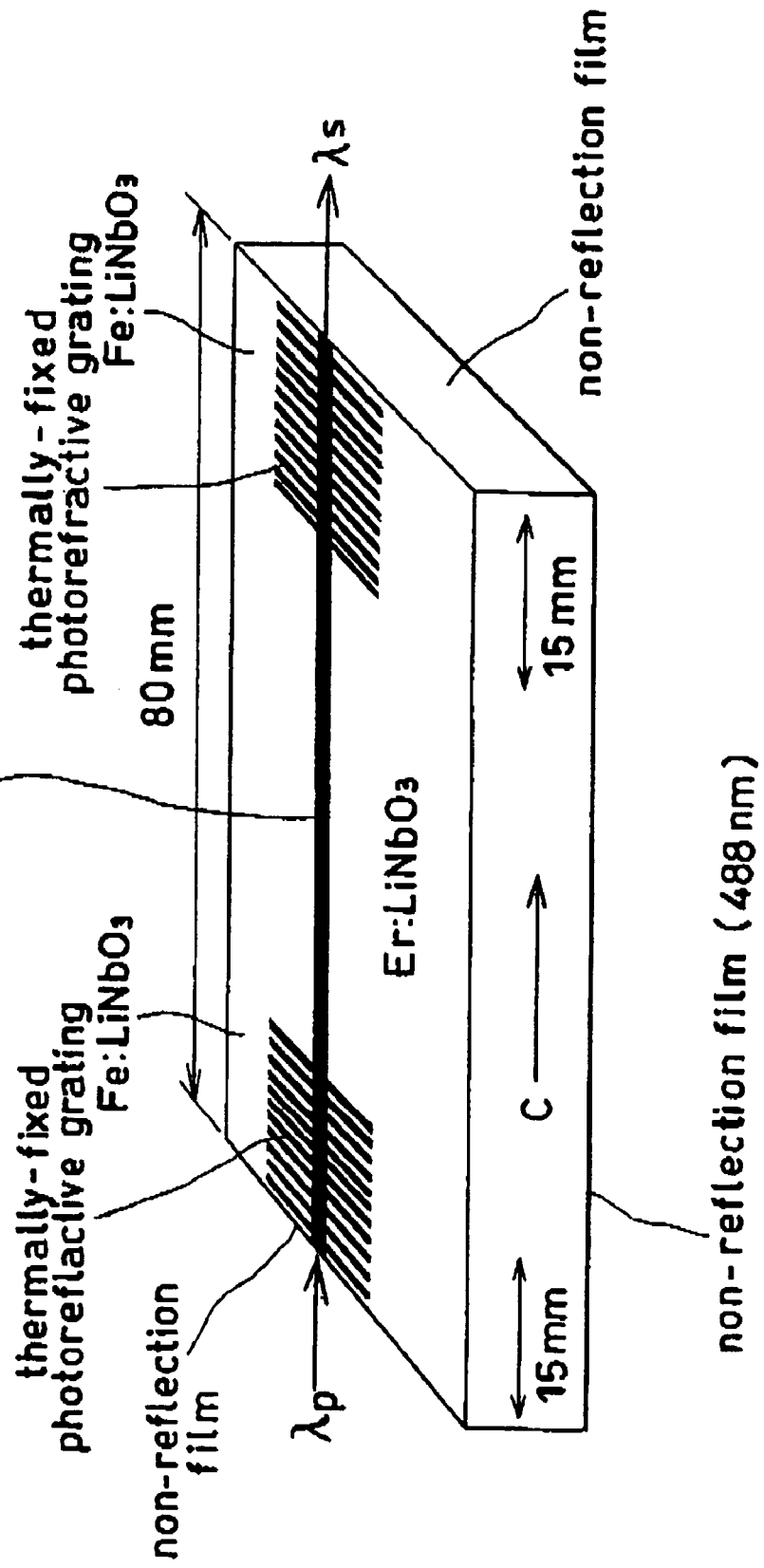
FIG. 7 is a perspective view illustrating a laser using a LiNbO$_3$ crystal as a second conventional example.

The individual components which are shown in FIG. 1 or in FIG. 4 do not need to be formed always on one LiNbO$_3$ crystal as shown in FIG. 3. When a LiNbO$_3$ crystal 21 or a LiNbO$_3$ crystal 23 in the direction of crystal allowing easy formation of a diffraction grating and a LiNbO$_3$ crystal 22 in the direction of crystal allowing easy formation of an optical modulation part do not coincide as shown in FIG. 5, for example, the diffraction grating and the optical modulation part are respectively formed on different crystals and cemented with an adhesive agent to complete the same shape shown in FIG. 1. The method for producing the individual components independently and cementing them together is at an advantage in enabling the individual components to be optimally manufactured.

The input light in FIGS. 1, 3, 4 or 5 is a laser beam having a wavelength of 1.550 nm for example. The exciting light source 7 of the optical modulator 4 is, for example, a semiconductor laser having a wavelength of 980 nm and an output of 200 mW. The laser beam emitted from the exciting light source 7 is introduced into the light path by the optical multiplexer 8. In this case, it is commendable to use an isolator 9 for the purpose of preventing the reflected light from disrupting the stability of the exciting light source. The laser beam from the exciting light source 7 excites the Er ions and enables this excitation to amplify the input light or the modulated light thereof. This amplification is aimed at compensating the attenuation of light occurring in the light path, optical modulator, first optical band-pass filter, second optical band-pass filter or third optical band-pass filter. When this amplification has an unduly large degree and the optical resonator is formed by the reflection occurring in the first optical band-pass filter and the reflection occurring in the second optical band-pass filter, the resonator possibly induces generation of a laser oscillation. It is, therefore, inferred that the degree of amplification of the light path fulfilling the function of amplification has a most suitable region.

The modulating signal is supplied to the optical modulator. When the third- (or nth)-order of sideband is intended, for example, as the modulating signal, it suffices to supply a signal having a frequency of ⅓ (or 1/n) of the modulating frequency which is aimed at. When the third-order sideband is intended, therefore, the difficulty incurred in the amplification or the transfer of the modulating signal is relaxed to a great extent by using a signal in the neighborhood of 1 GHz as a modulating signal even when the signal in the neighborhood of 3 GHz is aimed at.

The reciprocating optical modulator of this invention comprises a light path fulfilling the function of amplification, an optical modulation part formed on the light path fulfilling the function of amplification, a first optical band-pass filter and a second optical band-pass filter formed to nip the optical modulation part therebetween and means to introduce an exciting light for exciting the light path, which components are formed arbitrarily either in a single optical crystal or in a multiplicity of optical crystals. The first optical band-pass filter is adapted to admit an incident light and reflect the light produced by the modulation of the incident light. The second optical band-pass filter is adapted to reflect an incident light and emit the light produced by the modulation of the incident light, with the object of effecting emission of an optical sideband of which frequency is a natural number times of the modulating signal. The optical modulator of this invention, therefore, enables the modulating signal to be supplied by the use of an amplifier or a feeder line having a comparatively narrow bandwidth in a simple and small structure and to be handled easily.

What is claimed is:

1. A reciprocating optical modulator comprising:
   a continuous light path configured to amplify a signal;
   an optical modulator positioned on the light path;
   a first optical band-pass filter and a second optical band-pass filter positioned on the input side and output side of the optical modulator, respectively; and
   an exciting light source configured to introduce light to excite the light path;
   said optical modulator, said first and second optical band-pass filters, and said exciting light source being disposed on the light path as formed in a single optical crystal or in a multiplicity of optical crystals, said first optical band-pass filter configured to admit incident light and to reflect modulated incident light, said second optical band-pass filter configured to reflect the incident light and the modulated incident light; and
   a third optical band-pass filter disposed between the optical modulator and the second optical band-pass filter, the third optical band-pass filter configured to remove the incident light.

2. A reciprocating optical modulator according to claim 1, wherein
   the optical crystal or optical crystals comprise lithium niobate ($LiNbO_3$),
   the optical modulator configured to utilize an electro-optical effect incited in conformity with voltage applied to an electrode disposed on the light path and having an impurity diffused therein,
   the light path includes one or more erbium (ER) doped optical crystals, and
   the first and second optical band-pass filters or the first, second and third optical band-pass filters are configured to utilize a periodic pattern formed on the one or more optical crystals.

* * * * *